United States Patent
Ashizawa

(10) Patent No.: US 12,503,071 B2
(45) Date of Patent: Dec. 23, 2025

(54) COLLISION DETECTION DEVICE AND COLLISION DETECTION METHOD

(71) Applicant: TOYOTA JIDOSHA KABUSHIKI KAISHA, Toyota (JP)

(72) Inventor: Masaki Ashizawa, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 58 days.

(21) Appl. No.: 18/739,356

(22) Filed: Jun. 11, 2024

(65) Prior Publication Data
US 2025/0121789 A1    Apr. 17, 2025

(30) Foreign Application Priority Data
Oct. 17, 2023 (JP) .................... 2023-179137

(51) Int. Cl.
| B60R 21/013  | (2006.01) |
| B60R 21/0132 | (2006.01) |
| B60R 21/0136 | (2006.01) |

(52) U.S. Cl.
CPC ...... *B60R 21/0132* (2013.01); *B60R 21/0136* (2013.01)

(58) Field of Classification Search
CPC .................. B60R 21/0132; B60R 21/0136
See application file for complete search history.

(56) References Cited

U.S. PATENT DOCUMENTS

| 6,345,679 | B1* | 2/2002 | Sasaki | B60R 21/38 |
| | | | | 296/193.11 |
| 6,516,278 | B1* | 2/2003 | Ishizaki | B60R 21/38 |
| | | | | 180/274 |
| 2002/0033294 | A1* | 3/2002 | Ishizaki | B60R 21/0136 |
| | | | | 180/274 |
| 2018/0341016 | A1* | 11/2018 | Ohmoto | G01S 13/931 |
| 2020/0062202 | A1* | 2/2020 | Umezawa | B60R 21/38 |
| 2020/0114927 | A1* | 4/2020 | Yokota | G06F 8/65 |

(Continued)

FOREIGN PATENT DOCUMENTS

| JP | 2000-326822 A | 11/2000 |
| JP | 4075721 B2 * | 4/2008 |

OTHER PUBLICATIONS

Machine translations of JP4075721B2 (Year: 2008).*

*Primary Examiner* — Long T Tran
(74) *Attorney, Agent, or Firm* — SoraIP, Inc.

(57) ABSTRACT

A collision detection device applied to a vehicle having a hood lock at a vehicle front end center portion includes a first acceleration sensor, a second acceleration sensor, a hood opening and closing sensor, and one or more processors that determine that a front collision has occurred when a condition that first acceleration is higher than a first collision determination threshold value and second acceleration is higher than a second collision determination threshold value is satisfied. The one or more processors execute a threshold raising process of changing the first collision determination threshold value from the basic value to a correction value larger than the basic value in response to detection that the front hood is opened, and a process of returning the first collision determination threshold value to the basic value in response to elapse of a predetermined time from detection that the front hood is closed.

5 Claims, 5 Drawing Sheets

(56) References Cited

U.S. PATENT DOCUMENTS

| | | | |
|---|---|---|---|
| 2020/0377048 A1* | 12/2020 | Umezawa | B60R 21/38 |
| 2021/0245693 A1* | 8/2021 | Lee | B60R 19/483 |
| 2025/0074352 A1* | 3/2025 | Fu | G06T 7/60 |

* cited by examiner

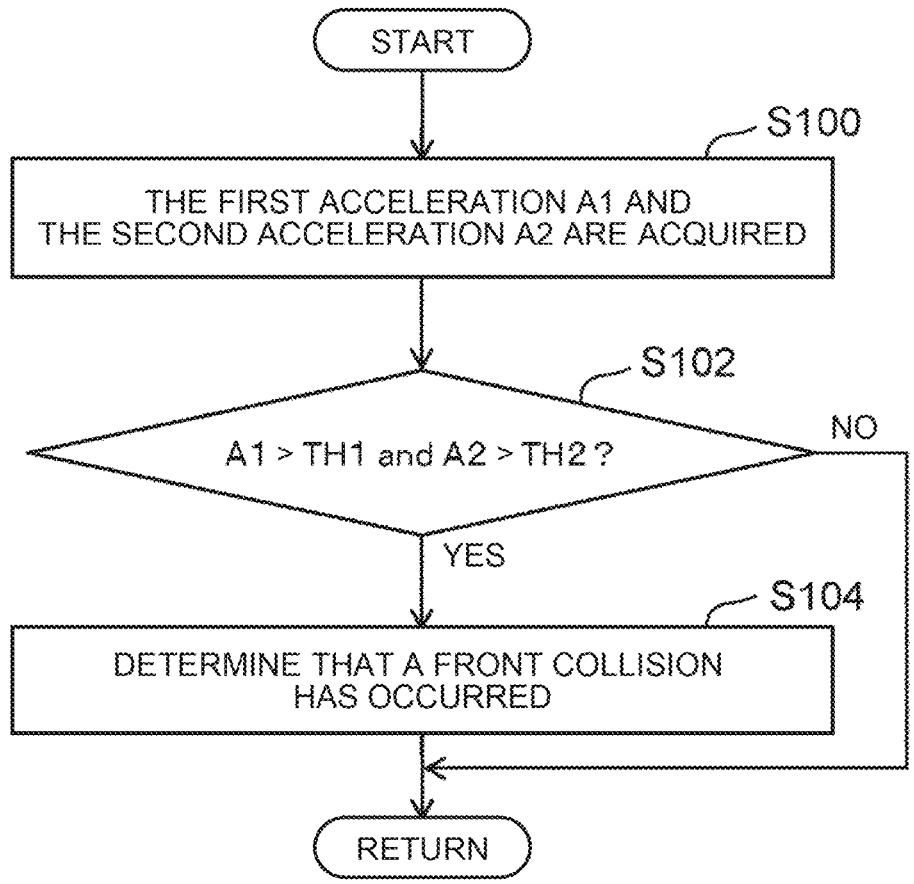
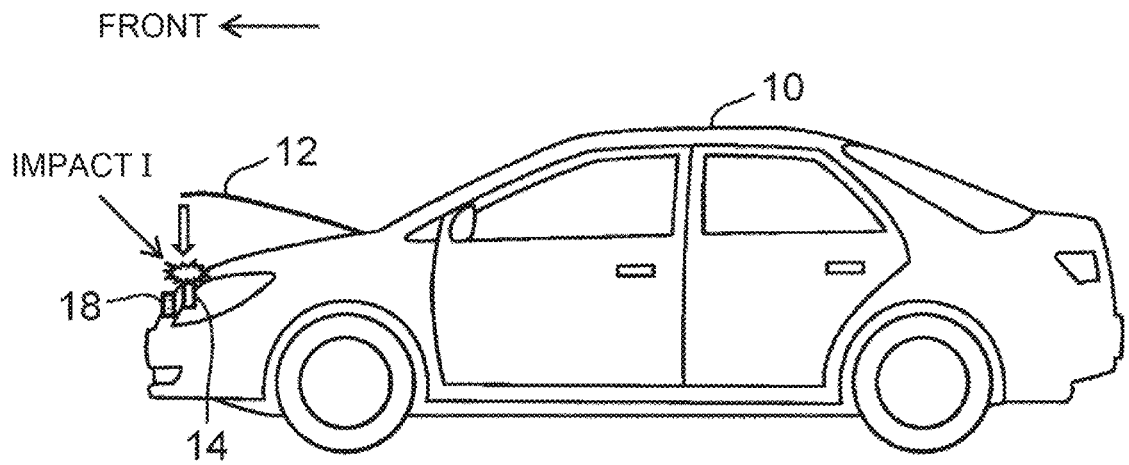

COLLISION DETECTION DEVICE AND COLLISION DETECTION METHOD

CROSS-REFERENCE TO RELATED APPLICATION

This application claims priority to Japanese Patent Application No. 2023-179137 filed on Oct. 17, 2023, incorporated herein by reference in its entirety.

BACKGROUND

1. Technical Field

The present disclosure relates to a technology for detecting front collision of a vehicle.

2. Description of Related Art

Japanese Unexamined Patent Application Publication No. 2000-326822 (JP 2000-326822 A) discloses a vehicle occupant protection system. In this system, collision determination using first and second acceleration sensors is made to determine operation of an occupant protection device such as an airbag. The first acceleration sensor is provided at a front portion of the vehicle, and the second acceleration sensor is provided at a central portion of the body of the vehicle. In order to suppress erroneous operation of the occupant protection device due to the use of the output of only the first acceleration sensor, the system executes the operation of the occupant protection device under a condition that accelerations detected by the first and second acceleration sensors exceed determination thresholds.

SUMMARY

As in the vehicle described in JP 2000-326822 A, a vehicle in which a first acceleration sensor disposed at a central portion of a front end of the vehicle and a second acceleration sensor disposed on a rear side of the vehicle from the first acceleration sensor are used for detecting front collision of the vehicle has the following problem. That is, when a hood lock for locking a front hood is disposed near the first acceleration sensor, the first acceleration sensor is likely to detect a high acceleration due to an impact caused by closing of the front hood (impact I for convenience of description).

Even if the impact I is great, front collision is not erroneously detected in response to the impact I as long as the second acceleration sensor does not detect a high acceleration. When the second acceleration sensor detects a high acceleration due to an accidental factor such as noise generation at the same timing as that of the application of the impact I to the first acceleration sensor, however, front collision may erroneously be detected due to the impact I.

The present disclosure has been made in view of the above problem, and an object thereof is to provide a technology capable of suppressing erroneous detection of front collision due to an impact caused by closing of a front hood.

A collision detection device according to the present disclosure is configured to detect front collision of a vehicle including a hood lock configured to lock a front hood at a vehicle front end central portion located at a front end of the vehicle and at a center in a vehicle lateral direction.

The collision detection device includes a first acceleration sensor, a second acceleration sensor, a hood opening and closing sensor, and one or more processors.

The first acceleration sensor is disposed at the vehicle front end central portion.

The second acceleration sensor is disposed on a rear side of the vehicle from the first acceleration sensor.

The hood opening and closing sensor is configured to detect opening and closing of the front hood.

The one or more processors are configured to determine that the front collision has occurred when a condition that a first acceleration detected by the first acceleration sensor is higher than a first collision determination threshold value and a second acceleration detected by the second acceleration sensor is higher than a second collision determination threshold value is satisfied.

The one or more processors are configured to execute:
 a threshold value increasing process for changing the first collision determination threshold value from a basic value to a corrected value larger than the basic value in response to detection by the hood opening and closing sensor that the front hood has been opened; and a process for returning the first collision determination threshold value to the basic value in response to an elapse of a predetermined period from detection by the hood opening and closing sensor that the front hood has been closed.

A collision detection method according to the present disclosure is a method for detecting front collision of a vehicle including a hood lock configured to lock a front hood at a vehicle front end central portion located at a front end of the vehicle and at a center in a vehicle lateral direction.

The collision detection method includes:
 determining that the front collision has occurred when a condition that a first acceleration detected by a first acceleration sensor disposed at the vehicle front end central portion is higher than a first collision determination threshold value and a second acceleration detected by a second acceleration sensor disposed on a rear side of the vehicle from the first acceleration sensor is higher than a second collision determination threshold value is satisfied;
 executing a threshold value increasing process for changing the first collision determination threshold value from a basic value to a corrected value larger than the basic value in response to detection by a hood opening and closing sensor that the front hood has been opened, the hood opening and closing sensor being configured to detect opening and closing of the front hood; and
 executing a process for returning the first collision determination threshold value to the basic value in response to an elapse of a predetermined period from detection by the hood opening and closing sensor that the front hood has been closed.

According to the present disclosure, it is possible to suppress the erroneous detection of the front collision due to the impact caused by the closing of the front hood by changing the first collision determination threshold value in response to the opening and closing of the front hood as described above.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 2 is a flowchart illustrating a basic process related to front collision detection according to the embodiment;

FIG. 3 is a diagram for explaining a problem of front collision detection using the first and second acceleration sensors;

DETAILED DESCRIPTION OF EMBODIMENTS

1. Configuration of the Vehicle

Figure 1:
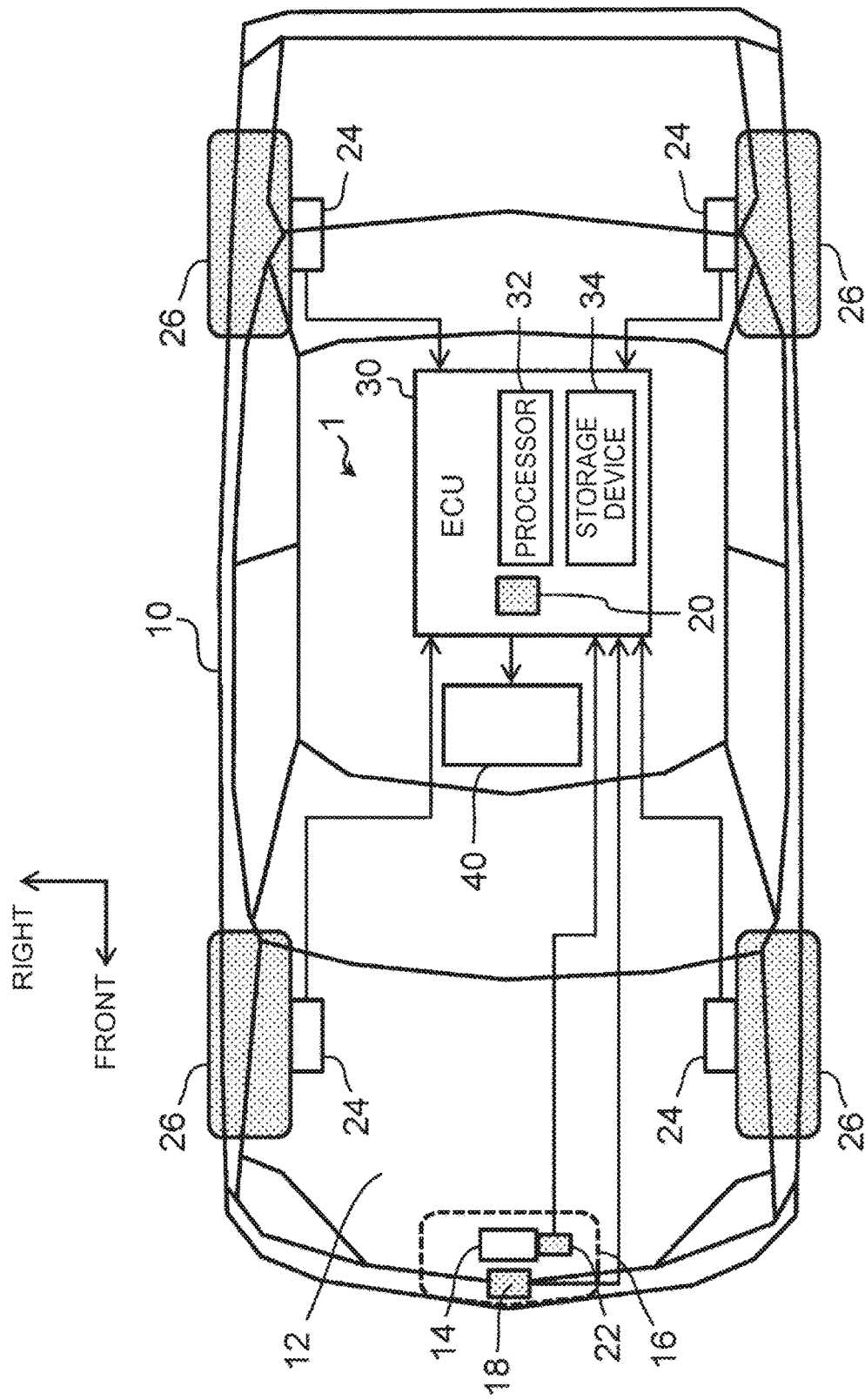
FIG. 1 is a diagram illustrating an example of a configuration of a vehicle on which a collision detection device according to an embodiment is mounted.

FIG. 1 is a diagram illustrating an example of a configuration of a vehicle 10 on which a collision detection device 1 according to an embodiment is mounted.

The vehicle 10 has a front hood 12. The front hood 12 opens and closes a power chamber provided at a front portion of the vehicle 10. The power chamber houses a driving device (for example, at least one of an internal combustion engine and an electric motor) of the vehicle 10. In the example where the drive includes an internal combustion engine, the front hood 12 is also referred to as the engine hood, and the power chamber is also referred to as the engine room or engine compartment.

The vehicle 10 has a hood lock 14 for locking the front hood 12. As shown in FIG. 3, which will be described later, the front hood 12 has a front opening structure in which the vehicle front side is opened. Therefore, the hood lock 14 is disposed on the front end side of the front hood 12. In other words, the hood lock 14 is disposed at the vehicle front end central portion 16 located at the front end of the vehicle 10 and at the center in the vehicle left-right direction. More specifically, the hood lock 14 is attached to a vehicle body component located at the vehicle front end central portion 16.

In addition, a first acceleration sensor 18 is disposed in the vehicle front end central portion 16. More specifically, the first acceleration sensor 18 is attached to a vehicle body component located at the vehicle front end central portion 16. The first acceleration sensor 18 detects a first acceleration (more specifically, a longitudinal acceleration) A1 generated at an attachment portion of the first acceleration sensor 18. The vehicle body component to which the first acceleration sensor 18 is attached is separate from the vehicle body component to which the hood lock 14 is attached, but may be the same.

The vehicle 10 further includes a second acceleration sensor 20. The second acceleration sensor 20 is disposed behind the vehicle from the first acceleration sensor 18. For example, the second acceleration sensor 20 is disposed at the center of the vehicle body in the vehicle front-rear direction and the vehicle left-right direction. More specifically, the second acceleration sensor 20 is accommodated in a device attached to a vehicle body component (for example, a floor panel) at the center of the vehicle body. The device may be, for example, an airbag ECU included in a later-described ECU 30. Alternatively, the second acceleration sensor 20 may be attached to the vehicle body component located at the center of the vehicle body. The second acceleration sensor 20 detects a second acceleration (more specifically, a longitudinal acceleration) A2 generated at an attachment portion of the second acceleration sensor 20.

The vehicle 10 includes a hood opening and closing sensor 22 and a wheel speed sensor 24. The hood opening and closing sensor 22 detects the opening/closing of the front hood 12, in other words, the unlocked/locked state of the hood lock 14. The wheel speed sensor 24 is disposed corresponding to each wheel 26 of the vehicle 10. The wheel speed sensor 24 is used to acquire the speed (vehicle speed V) of the vehicle 10.

Vehicle 10 includes an electronic control unit (ECU) 30. ECU 30 is a computer that controls the vehicles 10. ECU 30 includes one or more processors 32 (hereinafter simply referred to as processors 32) and one or more storage devices 34 (hereinafter simply referred to as storage devices 34). The processor 32 executes various processes. The various processes include processes related to the "front collision detection" described later and processes related to the operation of the airbag device 40. The storage device 34 stores various kinds of information necessary for processing by the processor 32. When the processor 32 executes a computer program, various processes by ECU 30 are realized. The computer program is stored in the storage device 34. Alternatively, the computer program may be recorded on a computer-readable recording medium. Note that ECU 30 may be configured by combining a plurality of ECUs capable of communicating with each other by, for example, Controller Area Network (CAN) communication.

As an example of an occupant protection device at the time of a collision of the vehicle 10, the vehicle 10 includes an airbag device 40. The airbag device 40 is configured to deploy the airbag based on a command from ECU 30 in response to detecting a frontal impact, which will be described later.

2. Front Collision Detection

In order to detect a front collision of the vehicle 10 (that is, a collision from the front of the vehicle 10), the "collision detection device 1" according to the present embodiment includes a first acceleration sensor 18, a second acceleration sensor 20, a hood opening and closing sensor 22, and a processor 32.

2-1. Basic Process

FIG. 2 is a flowchart illustrating a basic process related to front collision detection according to the embodiment. The process of this flow chart is repeatedly executed by the processor 32 of ECU 30 during the system-startup of the vehicle 10.

In FIG. 2, in S100, the processor 32 acquires the first acceleration A1 and the second acceleration A2 using the first acceleration sensor 18 and the second acceleration sensor 20, respectively.

Next, in S102, the processor 32 determines whether or not the condition C that the first acceleration A1 is higher than the first collision determination threshold TH1 and the second acceleration A2 is higher than the second collision determination threshold TH2 is satisfied. The first collision determination threshold TH1 and the second collision determination threshold TH2 are determined in advance and stored in the storage device 34, for example. The first collision determination thresholds TH1 are changed between the basic values TH1b and the corrected values TH1c by the process illustrated in FIG. 5 described later.

If the above condition C is not satisfied (S102; No), the process returns. On the other hand, if the condition C is satisfied (S102; Yes), the process proceeds to S104. In S104, the processor 32 determines that a frontal impact has occurred. That is, the processor 32 detects a frontal collision.

2-2. Issues

Next, referring to FIG. 3 and FIGS. 4A to 4C, a problem of detecting a frontal crash using the first and second acceleration sensors 18 and 20 will be described.

As described above, the first acceleration sensor 18 is disposed in the vehicle front end central portion 16 (see FIG. 1) similarly to the hood lock 14. That is, the first acceleration sensor 18 is disposed near the hood lock 14. Therefore, as shown in FIG. 3, when the front end position of the front hood 12 is high when the user of the vehicle 10 closes the front hood 12, a large impact is easily transmitted to the first acceleration sensor 18. Consequently, the first acceleration sensor 18 can easily detect a large first acceleration A1. Hereinafter, for the sake of convenience of explanation, an impact generated when the front hood 12 is closed is also simply referred to as "impact I".

Figure 4A:
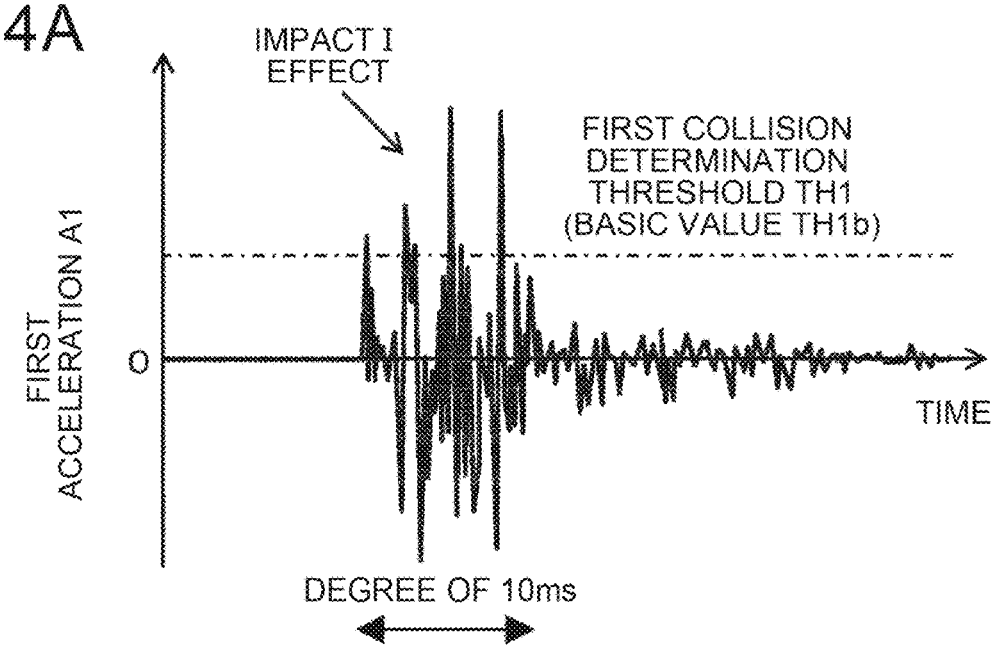
FIG. 4A is a diagram illustrating an example of a problem of detecting a front collision using first and second acceleration sensors.

FIG. 4A shows an exemplary temporal waveform of the first acceleration A1 detected by the first acceleration sensor 18 when the above-described impact I occurs. In this embodiment, the first acceleration A1 (impact G) exceeding the basic value TH1b of the first collision determination threshold TH1 is detected due to the impact I. The basic value TH1b is, for example, a 20 G. A large change in the first acceleration A1 as shown in FIG. 4A caused by the impact I occurs over a duration of, for example, about 10 milliseconds. In addition, the attachment position of the first acceleration sensor 18 to the vehicle 10 (vehicle body) is a position where, when the basic value TH1b is used as the first collision determination threshold TH1, the first acceleration A1 exceeds the first collision determination threshold TH1 depending on the magnitude of the impact I when the front hood 12 is closed.

Figure 4B:
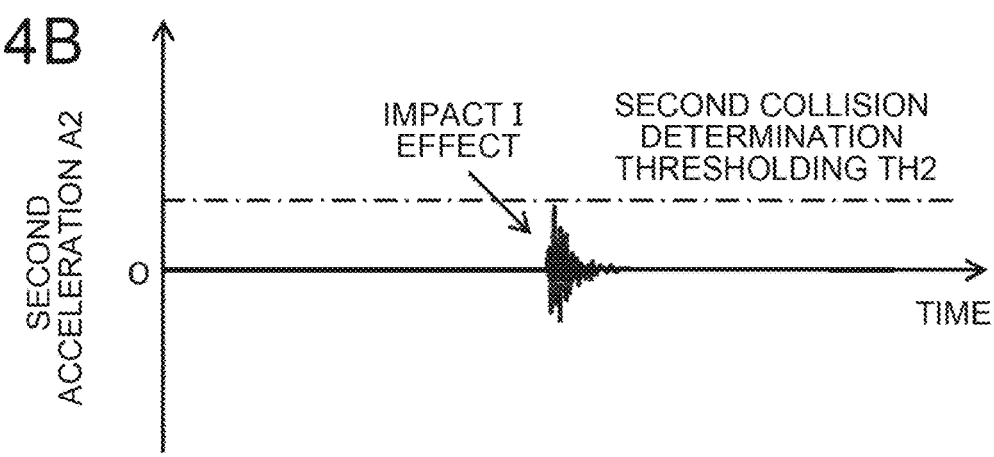
FIG. 4B is a diagram for explaining another example of the problem of detecting a front collision using the first and second acceleration sensors.

FIG. 4B shows an exemplary temporal waveform of the second acceleration A2 detected by the second acceleration sensor 20 when the same impact I as shown in FIG. 4A occurs. The time waveform is affected by the impact I. However, in this instance, the second acceleration A2 does not exceed the second collision determination thresholds TH2 (e.g., 1.3 G). Therefore, even if the first acceleration A1 exceeds the first collision determination threshold TH1 (basic value TH1b), the front collision is not erroneously detected due to the impact I. Therefore, the airbag device 40 does not malfunction in response to the occurrence of the impact I. In addition, in the embodiment shown in FIG. 4B, the redundancy due to the use of the two acceleration sensors 18 and 20 to detect frontal crashes may be said to be functioning properly.

Figure 4C:
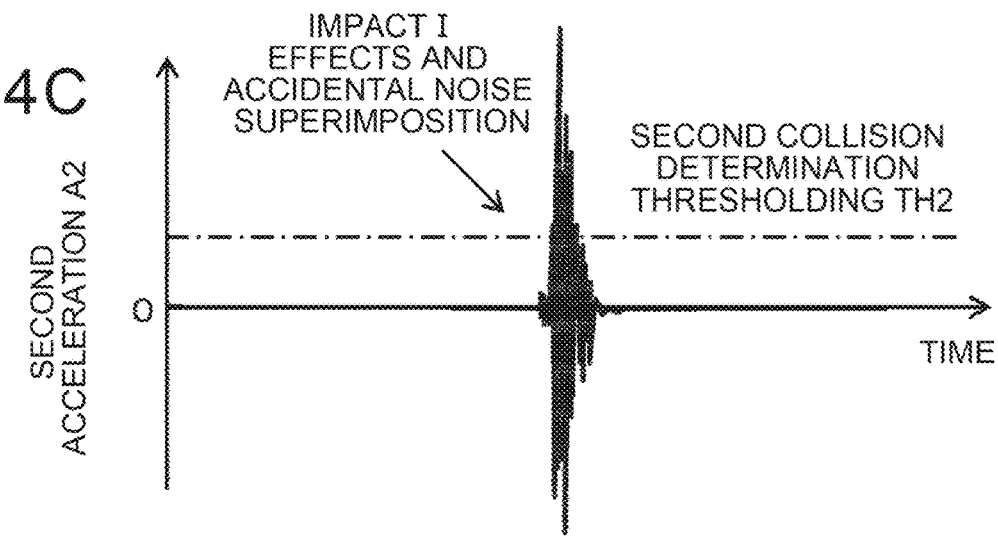
FIG. 4C is a diagram for explaining another example of the problem of detecting a front collision using the first and second acceleration sensors.

On the other hand, in FIG. 4C, the second acceleration sensor 20 is output at the same time as the generation of the impact I, which is the same as that shown in FIG. 4A. In this case, the second acceleration A2 exceeds the second collision determination threshold TH2. Consequently, in this embodiment, the condition that the first acceleration A1 is higher than the first collision determination threshold TH1 (basic value TH1b) and the second acceleration A2 is also higher than the second collision determination threshold TH2 is satisfied, and the front collision is erroneously detected due to the impact I.

Even if noises as shown in FIG. 4C are not superimposed on the output of the second acceleration sensor 20, the second acceleration sensor 20 may detect a higher second acceleration A2. This is caused by factors such as an accidental application of another large impact to the second acceleration sensor 20 at the same time as the occurrence of the impact I. As a consequence, if the second acceleration A2 exceeds the second collision determination threshold TH2, the front collision is erroneously detected due to the impact I as in the case shown in FIG. 4C. Note that, as an example of the application of an accidental other large impact described here, it corresponds to a case where the user of the vehicle 10 erroneously applies a strong impact to ECU 30 in which the second acceleration sensor 20 is incorporated.

2-3. Measures

In order to suppress erroneous detection of the front collision caused by the impact I, in the present embodiment, the processor 32 executes the "threshold increase process" in response to detection of the opening of the front hood 12 by the hood opening and closing sensor 22. This threshold increase process is a process of changing the first collision determination threshold TH1 from the basic value TH1b to a corrected value TH1c larger than the basic value TH1b. More specifically, in the present embodiment, the processor 32 executes the threshold increase process on the condition that the vehicle speed V is zero.

Further, in the present embodiment, the processor 32 executes a process of returning the first collision determination threshold TH1 to the basic value TH1b in response to the elapse of the predetermined period T from the detection of the closing of the front hood 12 by the hood opening and closing sensor 22.

Figure 5:
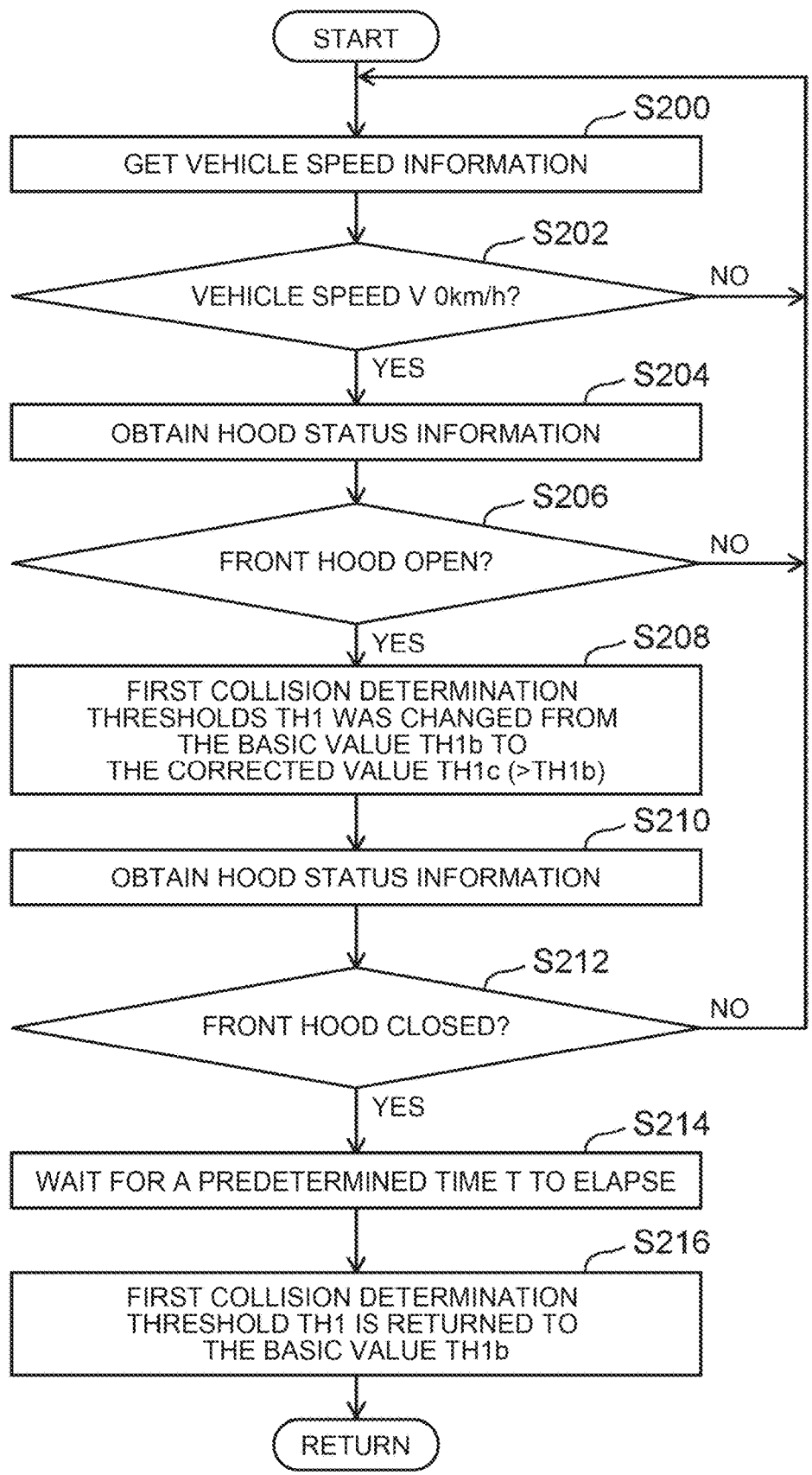
FIG. 5 is a flow chart showing a process relating to switching of the first collision determination threshold TH1 in FIG. 2.

FIG. 5 is a flow chart illustrating a process related to switching of the first collision determination threshold TH1 in FIG. 2. The processor 32 executes the processing of this flowchart in parallel with the processing of the flowchart shown in FIG. 2.

In FIG. 5, in S200, the processor 32 acquires vehicle speed data. The vehicle speed information is information on the vehicle speed V of the vehicle 10, and is based on, for example, the output of the wheel speed sensor 24. Next, in S202, it is determined whether or not the vehicle speed V is 0 km/h. Consequently, when the vehicle speed V is not 0 km/h (S202; No), the process returns to S200. On the other hand, when the vehicle speed V is 0 km/h (S202; Yes), the process proceeds to S204.

In S204, the processor 32 obtains food status information. The hood state information is information indicating that the front hood 12 is in the open state or the closed state, and is based on the output of the hood opening and closing sensor 22.

In S206 following S204, the processor 32 determines whether the front hood 12 is in the open state based on the hood state information. Consequently, if the front hood 12 is closed (S206; No), the process returns to S200. On the other hand, when the front hood 12 is open (S206; Yes), the process proceeds to S208.

S208 process corresponds to the above-described "threshold-raising process". That is, in S208, the processor 32 changes the first collision determination threshold TH1 from the basic value TH1b to the corrected value TH1c. The basic value TH1b is, for example, a predetermined value. As described above, the basic value TH1$b$ is, for example, a 20 G. The corrected value TH1$c$ is determined to be a value larger than the basic value TH1$b$. The corrected value TH1$c$ is, for example, a predetermined value.

Figure 6:
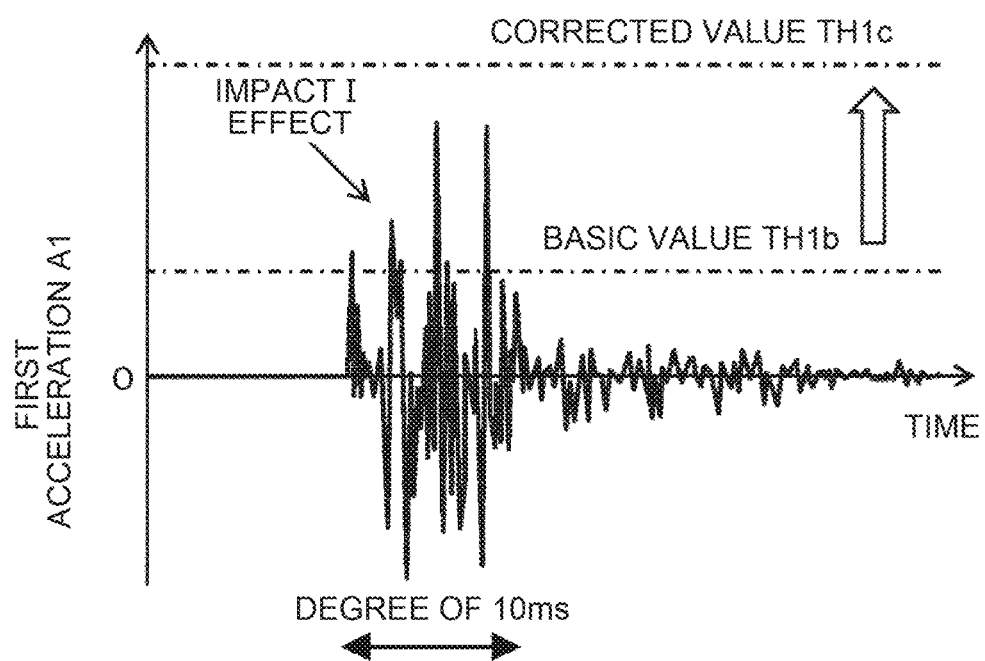
FIG. 6 is a diagram for explaining a relation between the basic value TH1$b$ of the first collision determination threshold TH1 and the corrected value TH1$c$.

FIG. 6 is a diagram for more specifically explaining the relation between the basic value TH1$b$ and the corrected value TH1$c$ of the first collision determination threshold TH1. In FIG. 6, as in FIG. 4A, a temporal waveform of the first acceleration A1 including the effect of the impact I is shown. As illustrated in FIG. 6, the corrected value TH1$c$ is determined to be larger than the estimated maximal value of the first acceleration A1 caused by the impact I caused by the closing of the front hood 12, for example. More specifically, the corrected value TH1$c$ is determined to be a large value with a sufficient margin, for example, with respect to the above-described assumed maximal value. The assumed maximum value can be determined, for example, by performing experiments or simulations in advance.

In S210 following S208, the processor 32 obtains food status information. In addition, between the acquisition of the hood status information in S204 and the acquisition of the hood status information in the present S210, there is a predetermined time-lapse.

In S212 following S210, the processor 32 determines whether the front hood 12 is in the closed state based on the hood state information. Consequently, if the front hood 12 is open (S212; No), the process returns to S200. On the other hand, when the front hood 12 is closed (S212; Yes), the process proceeds to S214.

In S214, the processor 32 waits for a predetermined period T to elapse starting at the time when a positive determination is made in S12 (i.e., detecting that the front hood 12 is closed). More specifically, the predetermined period T is determined to include a period (for example, a period of about 10 ms shown in FIG. 6) during which the impact I caused by the closing of the front hood 12 acts on the vehicle front end central portion 16, and is, for example, 1 second. After the predetermined period T has elapsed, the process proceeds to S216.

In S216, the processor 32 executes a process of returning the first collision determination thresholds TH1 from the corrected values TH1$c$ to the basic values TH1$b$.

3. Effect

As described above, according to the collision detection device 1 of the present embodiment, the first collision determination threshold value TH1 is changed from the basic value TH1$b$ to the corrected value TH1$c$ larger than the basic value TH1$b$ in response to the detection of the opening of the front hood 12 (threshold increase process). Then, the first collision determination thresholds TH1 are returned to the basic values TH1$b$ in response to the lapse of the predetermined period T from the detection of the closing of the front hood 12. In this way, the first collision determination thresholds TH1 are increased from the opening to the closing of the front hood 12. Accordingly, even when the second acceleration sensor 20 accidentally detects a higher second acceleration A2 at the same time as when the impact I is generated, erroneous detection of the front collision is suppressed. This leads to suppression of malfunction of the airbag device 40.

Broadly speaking, the above-described threshold increase processing may also be executed when the vehicle speed V is not zero. In addition, it is assumed that the opening and closing of the front hood 12 by the user of the vehicle 10 is basically performed when the vehicle speed V is zero. Therefore, according to the present embodiment, the above-described threshold increase processing is executed on condition that the vehicle speed V is zero. Accordingly, it is possible to prevent the front collision from being erroneously detected due to the influence of the impact I while more accurately grasping the impact I caused by the user closing the front hood 12.

Further, according to the present embodiment, the predetermined period T is determined to include a time period during which the impact I caused by the closing of the front hood 12 acts on the vehicle front end central portion 16 (refer to S214 process). Accordingly, it is possible to more reliably suppress the first acceleration A1 from exceeding the first collision determination thresholds TH1 due to the impact I.

Further, according to the present embodiment, the above-described corrected value TH1$c$ is determined to be larger than the estimated maximal value of the first acceleration A1 caused by the impact I caused by the closing of the front hood 12. Accordingly, it is possible to more reliably suppress the first acceleration A1 from exceeding the first collision determination thresholds TH1 due to the impact I.

What is claimed is:

1. A collision detection device configured to detect front collision of a vehicle including a hood lock configured to lock a front hood at a vehicle front end central portion located at a front end of the vehicle and at a center in a vehicle lateral direction, the collision detection device comprising:
    a first acceleration sensor disposed at the vehicle front end central portion;
    a second acceleration sensor disposed on a rear side of the vehicle from the first acceleration sensor;
    a hood opening and closing sensor configured to detect opening and closing of the front hood; and
    one or more processors configured to determine that the front collision has occurred when a condition that a first acceleration detected by the first acceleration sensor is higher than a first collision determination threshold value and a second acceleration detected by the second acceleration sensor is higher than a second collision determination threshold value is satisfied, wherein
    the one or more processors are configured to execute:
    a threshold value increasing process for changing the first collision determination threshold value from a basic value to a corrected value larger than the basic value in response to detection by the hood opening and closing sensor that the front hood has been opened; and
    a process for returning the first collision determination threshold value to the basic value in response to an elapse of a predetermined period from detection by the hood opening and closing sensor that the front hood has been closed.

2. The collision detection device according to claim 1, wherein the one or more processors are configured to execute the threshold value increasing process under a condition that a speed of the vehicle is zero.

3. The collision detection device according to claim 1, wherein the predetermined period is determined to include a period during which an impact caused by closing of the front hood acts on the vehicle front end central portion.

4. The collision detection device according to claim 1, wherein the corrected value is determined to be larger than an expected maximum value of the first acceleration generated by an impact caused by closing of the front hood.

5. A collision detection method for detecting front collision of a vehicle including a hood lock configured to lock a front hood at a vehicle front end central portion located at a front end of the vehicle and at a center in a vehicle lateral direction, the collision detection method comprising:

determining that the front collision has occurred when a condition that a first acceleration detected by a first acceleration sensor disposed at the vehicle front end central portion is higher than a first collision determination threshold value and a second acceleration detected by a second acceleration sensor disposed on a rear side of the vehicle from the first acceleration sensor is higher than a second collision determination threshold value is satisfied;

executing a threshold value increasing process for changing the first collision determination threshold value from a basic value to a corrected value larger than the basic value in response to detection by a hood opening and closing sensor that the front hood has been opened, the hood opening and closing sensor being configured to detect opening and closing of the front hood; and executing a process for returning the first collision determination threshold value to the basic value in response to an elapse of a predetermined period from detection by the hood opening and closing sensor that the front hood has been closed.

* * * * *